United States Patent
Sridhara et al.

(10) Patent No.: US 10,416,993 B2
(45) Date of Patent: Sep. 17, 2019

(54) MOBILE APPLICATION UPDATE MANAGER

(71) Applicant: International Business Machines Corporation, Armonk, NY (US)

(72) Inventors: Giriprasad Sridhara, Bangalore (IN); Rahul Aralikatte, Bangalore (IN); Senthil Kumar Kumarasamy Mani, Thanisandra (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/726,441

(22) Filed: Oct. 6, 2017

(65) Prior Publication Data

US 2019/0108015 A1    Apr. 11, 2019

(51) Int. Cl.
  *G06F 8/658*    (2018.01)
  *G06Q 30/02*    (2012.01)

(52) U.S. Cl.
  CPC ......... *G06F 8/658* (2018.02); *G06Q 30/0282* (2013.01)

(58) Field of Classification Search
  CPC .......................... G06F 8/658; G06Q 30/0282
  USPC ........................................................ 717/169
  See application file for complete search history.

(56) References Cited

U.S. PATENT DOCUMENTS

| | | | |
|---|---|---|---|
| 8,108,255 B1 | 1/2012 | Robinson et al. | |
| 8,380,694 B2 | 2/2013 | Ruhl et al. | |
| 8,578,501 B1 | 11/2013 | Ogilvie | |
| 9,582,264 B1 | 2/2017 | Anbil Parthipan et al. | |
| 10,127,034 B1* | 11/2018 | Troyanovsky | G06F 8/658 |
| 2002/0078142 A1* | 6/2002 | Moore | G06F 8/658 709/203 |
| 2004/0237081 A1* | 11/2004 | Homiller | G06F 8/658 717/170 |
| 2005/0227683 A1* | 10/2005 | Draluk | H04M 3/42178 455/419 |
| 2006/0004756 A1* | 1/2006 | Peleg | G06F 8/62 |
| 2007/0083571 A1* | 4/2007 | Meller | G06F 8/654 |
| 2007/0169089 A1* | 7/2007 | Bantz | G06F 9/4484 717/168 |
| 2007/0261050 A1* | 11/2007 | Nakano | G06F 21/10 717/172 |

(Continued)

OTHER PUBLICATIONS

Arun et al, "Speculative Client Execution in Deferred Update Replication", [Online], 2014, pp. 1-6, [Retrieved from internet on Apr. 29, 2019], <http://delivery.acm.org/10.1145/2680000/2676738/a5-arun.pdf> (Year: 2014).*

(Continued)

*Primary Examiner* — Ziaul A Chowdhury
*Assistant Examiner* — Zengpu Wei
(74) *Attorney, Agent, or Firm* — Stosch Sabo

(57) ABSTRACT

A mobile application update manager functioning on a user device defers a new update for a mobile application for a first time period. The mobile application update manager predicts a time and size of a next update for the mobile application, a set of changes associated with the new update, and a relevancy of the set of changes to a user of the user device. The mobile application update manager recommends if the new update should be implemented or if the user should defer until a next update is available for the mobile application.

18 Claims, 11 Drawing Sheets

(56) References Cited

U.S. PATENT DOCUMENTS

| | | | | |
|---|---|---|---|---|
| 2008/0052701 | A1* | 2/2008 | Abernethy | G06F 8/656 717/170 |
| 2011/0173191 | A1 | 7/2011 | Tsaparas et al. | |
| 2012/0030275 | A1* | 2/2012 | Boller | G06F 17/30902 709/203 |
| 2012/0063317 | A1* | 3/2012 | Muraoka | H04W 52/0206 370/235 |
| 2013/0066800 | A1 | 3/2013 | Falcone et al. | |
| 2013/0144802 | A1 | 6/2013 | Bank et al. | |
| 2013/0159985 | A1 | 6/2013 | Gilman et al. | |
| 2013/0173491 | A1 | 7/2013 | Nations et al. | |
| 2013/0231989 | A1 | 9/2013 | Abu Ayyash | |
| 2013/0275554 | A1 | 10/2013 | Smith | |
| 2014/0173586 | A1 | 6/2014 | Dugan | |
| 2016/0179498 | A1* | 6/2016 | Das | G06F 8/65 717/171 |
| 2016/0225030 | A1* | 8/2016 | Iyer | G06Q 30/0269 |
| 2018/0165264 | A1* | 6/2018 | Venkataraman | G06F 8/65 |

OTHER PUBLICATIONS

Song et al, "Managing Frequent Updates in R-Trees for Update-Intensive Applications", [Online], 2009, pp. 1573-1589, [Retrieved from internet on Apr. 29, 2019], <https://ieeexplore.ieee.org/stamp/stamp.jsp?tp=&arnumber=4674349> (Year: 2009).*

Pitoura et al, "Locating Objects in Mobile Computing", [Online], 2001, pp. 1-43, [Retrieved form internet on Apr. 29, 2019], <https://www.researchgate.net/profile/George_Samaras2/publication/3296972_Locating_objects_in_mobile_computing/links/547345d60cf24bc8ea19e675.pdf> (Year: 2001).*

Tian et al., "Supporting Privacy-Conscious App Update Decisions with User Reviews", SPSM'15, Oct. 12, 2015, Denver, CO, © 2015 ACM, DOI: http://dx.doi.org/10.1145/2808117.2808124, 11 pages. http://mews.sv.cmu.edu/papers/spsm-15.pdf.

* cited by examiner

| App | User | Date | Rating | Review |
|---|---|---|---|---|
| App 1 | User 1 | 10/28/2015 | 5 | Great so far. Great speedy load plus works viewing photos and videos offline! Great update! |
| App 2 | User 2 | 11/9/2015 | 5 | Major improvments after last update Now twitter is smoother and I like the new like button. Great Job |
| App 3 | User 3 | 1/28/2016 | 5 | Like. This update fix the problem which was it was slow before now is fine |
| App 4 | User 4 | 9/22/2015 | 5 | The app is stable now and no more crashes. Thanks for the new update. Please add block sender option.. |
| App 5 | User 5 | 8/16/2016 | 1 | SPAM PAGES!! Why are we suffering through daily updates and nothing improves!? |
| App 6 | User 6 | 8/4/2016 | 1 | Rubbish spend more time doing updates than using this useless App. |
| App 7 | User 7 | 8/2/2016 | 2 | Tell us what the changes are when there's an update, not just "we're making the app better". |
| App 8 | User 8 | 8/3/2016 | 1 | Terrible, always crashing |

FIG. 8

| Date of Update | Size of Update (Mb) |
|---|---|
| Jan 1 2015 | 10 |
| Jan 26 2015 | 8 |
| ... | ... |
| Aug 15 2015 | 6 |
| ... | ... |
| Dec 1 2015 | 12 |

1102 → ★★★★★ 2/13/2014
Samsung Galaxy S3 for an older v...

Awesome!
This is a great game. If you are looking for more than the typical phone game, this is it. Very awesome gameplay and rich community of players worldwide! You won't be disappointed.

Cloudex Tan  
1104 → ★★★★★ 11/2/2016
For an older version

Man, it's truly ~~████████~~
It's so addictive compare to other games. It's one of the best strategy games, try it. Besides, it would be an awesome gameplay and this android game has good graphics. The game is a great time killer. However, the games doesn't have any issue such as slow loading. Loved it.

FIG. 11

MOBILE APPLICATION UPDATE MANAGER

BACKGROUND

The present disclosure relates to software updates, and, more specifically, to mobile application (app) updates for user devices.

The number of smart phones and other user devices capable of running mobile applications are growing. Likewise, the number of mobile applications available for smart phones and other user devices is also growing. Mobile applications can have frequent updates to fix problems and/or add features which can result in increased processing overhead, increased downtime, and/or increased data usage by a device executing the mobile application. Users can be dissatisfied by the inconvenience of numerous updates.

SUMMARY

Aspects of the present disclosure are directed toward a method comprising deferring, for a first time period, a first update for a mobile application operating on a user device associated with a first user profile. The method can further comprise determining a predicted date of a next update for the mobile application and a predicted size of the next update for the mobile application based on respective dates and respective sizes for previous updates for the mobile application. The method can further comprise determining at least one predicted change associated with the first update based on reviews of the mobile application. The method can further comprise estimating a relevance of the at least one predicted change to the first user profile based on characteristics of the first user profile and characteristics of at least a second user profile associated with at least one review of an updated version of the mobile application. The method can further comprise generating a score based on the predicted date of the next update, the predicted size of the next update, the at least one predicted change, and the relevance of the at least one predicted change. The method can further comprise, in response to the score being greater than a first threshold, implementing the first update for the mobile application on the user device.

Further aspects of the present disclosure are directed toward a system comprising a processor communicatively coupled to a memory storing instructions which, when executed by the processor, cause the processor to perform a method comprising deferring, for a first time period, a first update for a mobile application operating on a user device associated with a first user profile. The processor can be configured to perform a method further comprising determining a predicted date of a next update for the mobile application and a predicted size of the next update for the mobile application based on respective dates and respective sizes for previous updates for the mobile application. The processor can be further configured to perform a method further comprising determining at least one predicted change associated with the first update based on reviews of the mobile application. The processor can be further configured to perform a method further comprising estimating a relevance of the at least one predicted change to the first user profile based on characteristics of the first user profile and characteristics of at least a second user profile associated with at least one review of an updated version of the mobile application. The processor can be further configured to perform a method further comprising generating a score based on the predicted date of the next update, the predicted size of the next update, the at least one predicted change, and the relevance of the at least one predicted change. The processor can be further configured to perform a method further comprising, in response to the score being greater than a first threshold, implementing the first update for the mobile application on the user device.

Further aspects of the present disclosure are directed toward a computer program product comprising a computer readable storage medium having program instructions embodied therewith, the program instructions executable by a processor to cause the processor to perform a method comprising deferring, for a first time period, a first update for a mobile application operating on a user device associated with a first user profile. The program instructions can be further configured to cause the processor to perform a method further comprising determining a predicted date of a next update for the mobile application and a predicted size of the next update for the mobile application based on respective dates and respective sizes for previous updates for the mobile application. The instructions can be further configured to cause the processor to perform a method further comprising determining at least one predicted change associated with the first update based on reviews of the mobile application. The instructions can be further configured to cause the processor to perform a method further comprising estimating a relevance of the at least one predicted change to the first user profile based on characteristics of the first user profile and characteristics of at least a second user profile associated with at least one review of an updated version of the mobile application. The instructions can be further configured to cause the processor to perform a method further comprising generating a score based on the predicted date of the next update, the predicted size of the next update, the at least one predicted change, and the relevance of the at least one predicted change. The program instructions can be configured to cause the processor to perform a method further comprising, in response to the score being greater than a first threshold, implementing the first update for the mobile application on the user device.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8 illustrates an example user review database in accordance with some embodiments of the present disclosure.

FIG. 9 illustrates an example update history database in accordance with some embodiments of the present disclosure.

FIG. 11 illustrates a second example user interface in accordance with some embodiments of the present disclosure.

Figure 1:
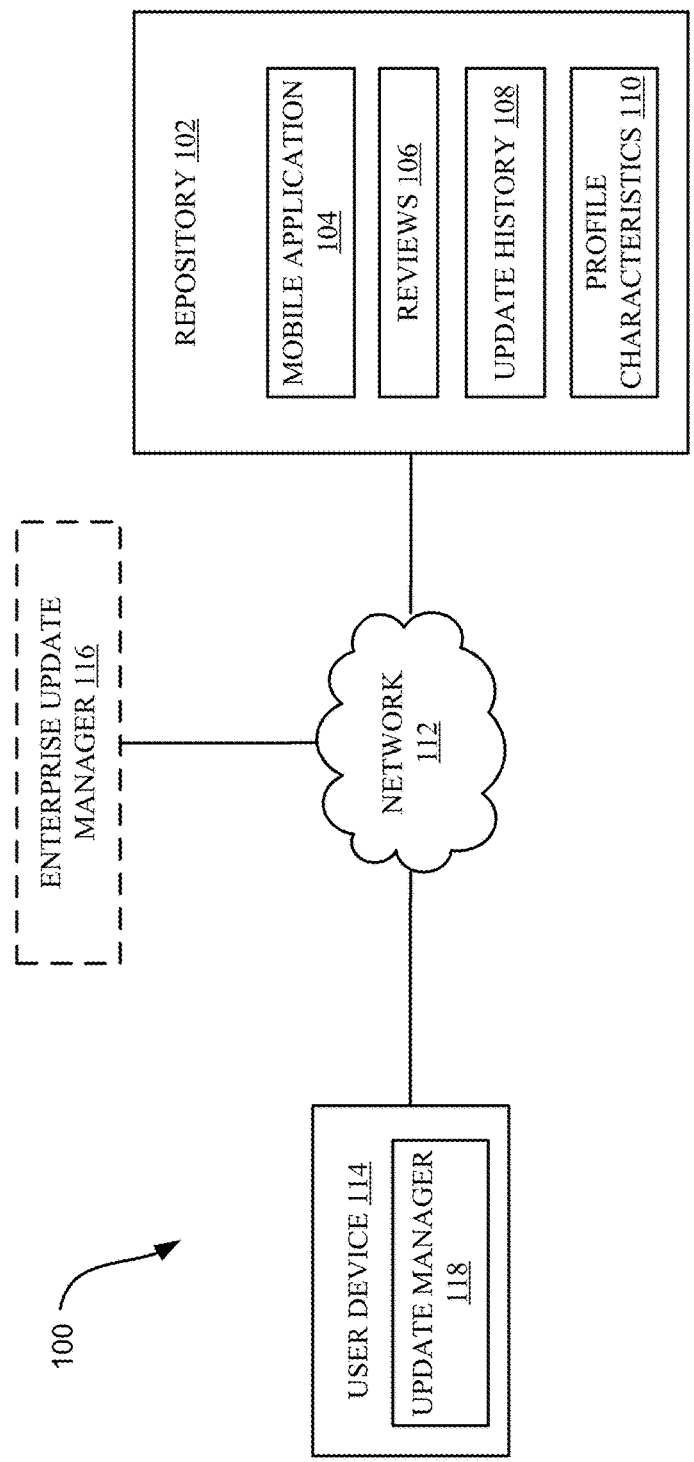
FIG. 1 illustrates a block diagram of an example update manager functioning in a network in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward software updates, and, more specifically, toward managing mobile application (app) updates for user devices.

A user device can store and execute many mobile applications. Each of the mobile applications can be associated with numerous updates improving existing functionality and/or adding new functionality. Aspects of the present disclosure can assist a user in deciding which updates to implement and which to defer. Aspects of the present disclosure can assist the user by, for example, estimating a date and size of a next update based on one or more prior (e.g., previous) updates for a given mobile application, estimating changes made in a current update based on user reviews prior to the current update and/or user reviews after the current update, and estimating a relevance score of the current update to the user based on profile similarities between the current user and users generating reviews.

Further aspects of the present disclosure can manage enterprise-wide mobile application updates. Aspects of the present disclosure can, for example, implement a current update to a portion of user devices in an enterprise and collect implicit and explicit information for a first time period. Based on the implicit and explicit information, aspects of the present disclosure can determine if the current update should be implemented on all applicable user devices of the enterprise.

Aspects of the present disclosure exhibit numerous advantages compared to the current state of the art. First, aspects of the present disclosure can reduce processing overhead on the user device, reduce downtime of the user device, and/or reduce data consumed by the user device by strategically implementing or deferring various updates based on a user's usage and/or habits, and/or based on characteristics of the update (e.g., characteristics collected from the prior history of updates and/or review comments for the mobile application). This advantage is particularly applicable as mobile applications, and updates to them, increase in size. Thus, individual updates can consume a large amount of time and/or a large amount of data to implement. These factors can contribute to user dissatisfaction, negative reviews of the mobile application, and/or decreased use of the mobile application. Furthermore, the number of mobile applications operating on individual user devices are also increasing, thereby increasing the number of updates in any given time interval. Thus, a user device implementing aspects of the present disclosure can advantageously realize decreased processing overhead, decreased downtime, increased storage availability, and/or decreased data usage.

Second, aspects of the present disclosure can provide the user with information not otherwise available to the user. For example, aspects of the present disclosure can estimate a time and size of a next update, predict changes made by a current update, and/or predict relevancy of the changes to the user.

Third, aspects of the present disclosure can advantageously monitor a current update on a portion of a population of user devices to determine if the update should be implemented on the whole population of user devices (e.g., in enterprise applications). The aforementioned advantages are example advantages, and embodiments exist which contain all, some, or none of the aforementioned advantages while remaining in the spirit and scope of the present disclosure.

Referring now to the drawings, FIG. 1 illustrates an example update manager functioning in a network in accordance with some embodiments of the present disclosure. The mobile application update network 100 includes a repository 102 connected to a user device 114 and, in some embodiments, an enterprise update manager 116 via a network 112. Network 112 can comprise a physical or virtual network. In some embodiments, network 112 utilizes a Wi-Fi protocol. In some embodiments, network 112 utilizes a cellular protocol (e.g., 3G, 4G, etc.).

The repository 102 can contain at least one mobile application 104, reviews 106 of respective versions of mobile application 104, an update history 108 for mobile application 104, and profile characteristics of users 110.

Mobile application 104 can be instructions for one or more applications operable on the user device 114. Although the term mobile application is used throughout, aspects of the present disclosure can likewise be implemented with any software (e.g., operating system software, desktop application, etc.) functioning on a user device and receiving updates.

Reviews 106 can include, for example, a textual, numeric, alphanumeric, symbolic, and/or a graphical rating (e.g., a number of stars, a letter rating, a percent likelihood of recommending the mobile application to a friend, a smiley face, etc.) and/or comments. Example reviews collected in an example review database are illustrated in FIG. 8.

Reviews 106 can be associated with profile characteristics 110 of the user writing the review. Profile characteristics 110 can include, for example, a type of user device, types of mobile applications stored on the user device, respective versions of respective mobile applications stored on the user device, an amount of usage of respective mobile applications, a type of usage of respective mobile applications, amounts and/or types of usage of the user device, a geographic location of the user device, personal information about the user such as, for example, age and/or gender.

The update history 108 of mobile application 104 can include release dates and update sizes for respective updates associated with mobile application 104 since the release of an initial version of the mobile application 104. An example update history database is illustrated in FIG. 9.

Mobile application 104, Reviews 106, update history 108, and profile characteristics 110 can be retrieved (e.g., mined) from, for example, a database, a mobile application website, a user device website, a third-party website, a mobile application platform, a mobile application store (e.g., an app-store), a social media platform, a different source, or a combination of the aforementioned sources.

User device 114 can comprise a smart phone, a mobile phone, a cellular phone, a tablet, a laptop, or a different user device capable of executing a mobile application. In some embodiments, user device 114 can be a desktop, workstation, server, or other device capable of executing software and receiving updates for the software. User device 114 can include update manager 118. Update manager 118 can gather information from repository 102 and generate a recommendation (and, in some embodiments, automatically implement the recommendation) to a user for executing or deferring a respective update for mobile application 104. Update manager 118 is described in further detail hereinafter with respect to FIGS. 2-7. Although one user device is shown, in some embodiments (e.g., for an enterprise application) a plurality of similar or different user devices can exist (e.g., hundreds or thousands) where respective updates for respective user devices are managed by the enterprise update manager 116.

Enterprise update manager 116 can comprise processor executable instructions for implementing a current update for mobile application 104 to a portion of user devices in an enterprise containing numerous (e.g., hundreds or thousands) of user devices. Enterprise update manager 116 is described in further detail hereinafter with respect to FIG. 6. Enterprise update manager 116 may exist in embodiments containing multiple user devices 114.

Figure 2:
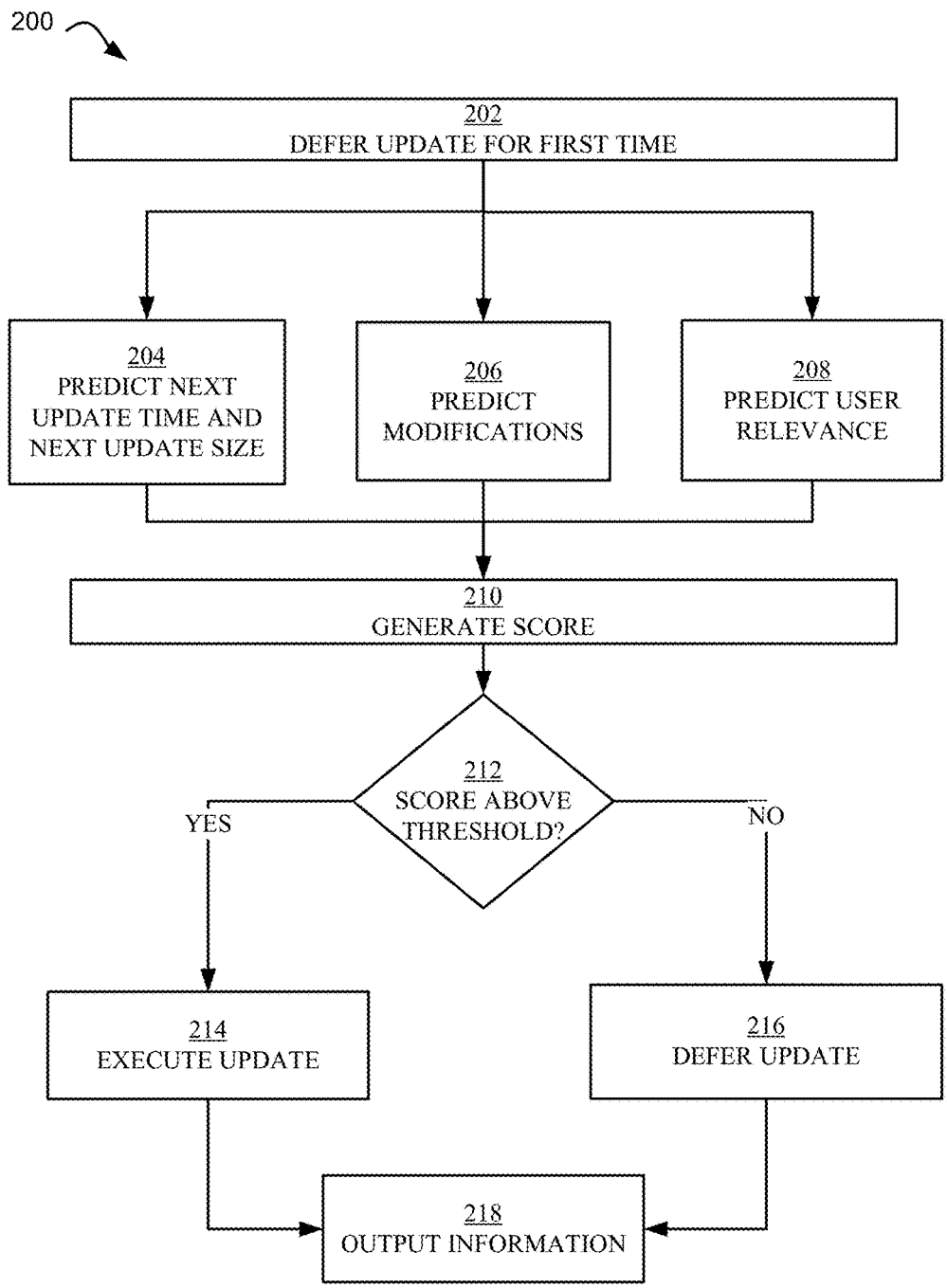
FIG. 2 illustrates a flowchart of an example method for managing an update in accordance with some embodiments of the present disclosure.

FIG. 2 illustrates an example method for managing a current update of a respective mobile application in accordance with some embodiments of the present disclosure. The method 200 can be executed by an update manager (e.g., update manager 118 of FIG. 1) or by a processor executing instructions. For consistency, the method 200 will hereafter be described as being implemented by an update manager, however, the method 200 can likewise be executed by different configurations of hardware components executing instructions.

In operation 202, the update manager defers an update for a first time period (e.g., a first amount of time). In some embodiments, the update manager defers the update by a proportion of time based on the estimated next update date (e.g., the update manager can defer the current update by 5% of the time between the current date and the estimated next update date). In some embodiments, rather than using the estimated next update date, the update manager may defer the current update by an amount of time proportional to an amount of time between the previous update and the current update. In some embodiments, the update manager can defer the current update by an automatically selected or manually configured standard amount of time (e.g., five days).

In operation 204, the update manager can predict a next update time and next update size for a next update for the respective mobile application. The update manager can use an update history to forecast a next update date and next update size. Operation 204 is described in more detail hereinafter with respect to FIG. 3.

In operation 206, the update manager can predict changes resulting from the current update. In some embodiments, the update manager can use reviews of the mobile application to determine at least one predicted change resulting from the update. Operation 206 is described in more detail hereinafter with respect to FIG. 4. In some embodiments, the update manager extracts changes from, for example, a change log associated with the mobile application in operation 206. However, as will be appreciated by one skilled in the art, in many cases a change log is not available and updates indicate general improvements without further details.

In operation 208, the update manager can predict a relevance score of the update to the user. The update manager can estimate a relevance score of the update to the user based on profile characteristics of the user and profile characteristics of users generating reviews of the mobile application. Operation 208 is described in more detail hereinafter with respect to FIG. 5.

As shown in the method 200, operations 204, 206, and 208 can occur simultaneously, approximately simultaneously, or sequentially in any order. Furthermore, in various embodiments, any one, or any two, of the operations 204, 206, and 208 can occur rather than all three.

In operation 210, the update manager generates a score based on the outputs of at least one of operations 204, 206, and 208. In some embodiments, the update manager generates a score representing an objective measure of desirability of the update. Notably, the score generated in operation 210 is an objective approximation of an otherwise unknown or subjective guess. For example, the score can comprise a number on a scale from 1 to 100 with a larger score indicating a higher applicability of the update and a lower score indicating a lower applicability of the update. In some embodiments, a shorter estimated time to a next update (e.g., predicted in operation 204) is associated with a lower score whereas a longer estimated time to a next update is associated with a larger score. In some embodiments, positive reviews resulting from a current update relative to a previous update are associated with a larger score, whereas negative reviews resulting from a current update relative to a previous update are associated with a lower score (e.g., predicted in operation 206). In some embodiments, a higher similarity between a current user profile of the user device and a user profile of a positive review related to the current update can be associated with a higher score, whereas a high similarity of the current user profile to a user profile of a negative review, or a low similarity of the current user profile to a user profile of any review can be associated with a lower score.

In various embodiments, operation 210 generates a single score, multiple scores, or combinations of scores and other data (e.g., textual information). Other data can include, for example, types of changes (e.g., a fix for a particular operating system, an added feature, etc.), a date of a next projected update, and so on.

In operation 212, the update manager determines if the score is above (e.g., greater than, greater than or equal to, or exceeding) or below (e.g., less than, less than or equal to, or under) a threshold. In some embodiments, the update manager determines if multiple respective scores are above or below multiple respective thresholds. The one or more thresholds can be automatically generated or manually configured.

If the score is above the threshold, the update manager proceeds to operation 214. In some embodiments, the update manager recommends executing the update in operation 214. In some embodiments, the update manager executes the update after recommending the update in operation 214. In some other embodiments, the update manager automatically executes the update in operation 214 without recommending. If the score is not above the threshold, the update manager proceeds to operation 216 and defers the update to the next update release. In some embodiments, operation 216 causes the update manager to automatically execute the next update received for the same application. In some embodiments, operation 216 causes the update manager to proceed again to operation 202 upon receiving a notification for the next update.

In operation 218, the update manager can output all or a portion of the information generated in operations 204, 206, 208, 210, 212, 214, and/or 216 to a user interface of a user device. In some embodiments, outputting the information further comprises storing the information in a local storage and/or communicating the outputs to one or more other devices, memories, and/or servers.

Figure 3:
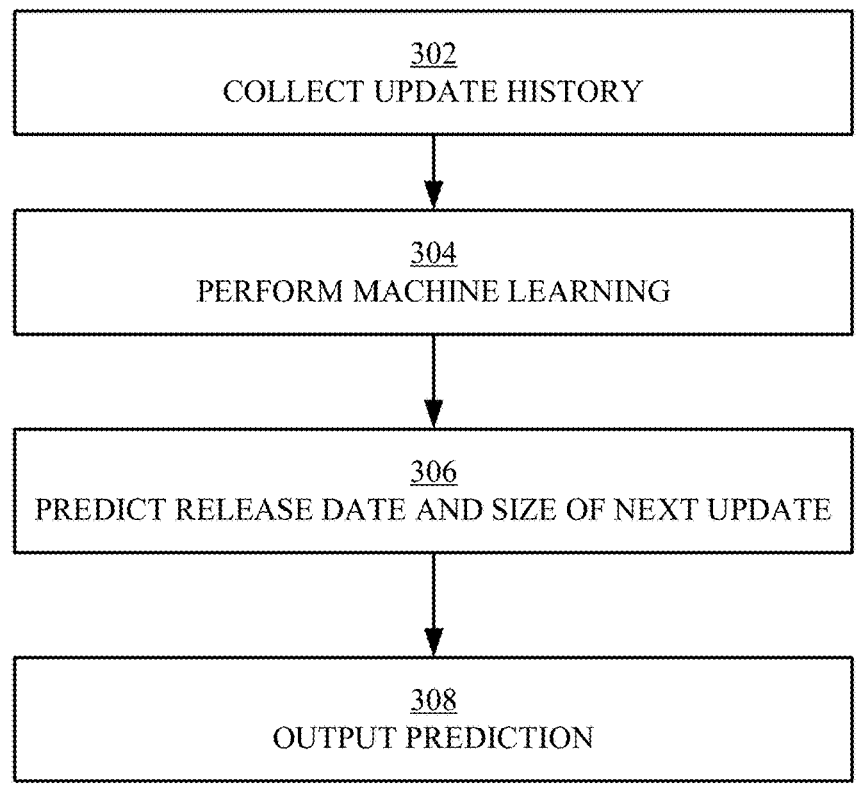
FIG. 3 illustrates a flowchart of an example method for predicting a next update in accordance with some embodiments of the present disclosure.

Referring now to FIG. 3, illustrated is a flowchart of an example method for predicting a next update for a mobile application in accordance with some embodiments of the present disclosure. In some embodiments, the method 300 is a sub-method of operation 204 of FIG. 2. The method 300 can be executed by an update manager (e.g., update manager 118 of FIG. 1) or by a processor executing instructions. For consistency, the method 300 will hereafter be described as being implemented by an update manager, however, the method 300 can likewise be executed by different configurations of hardware components executing instructions.

In operation 302, the update manager collects an update history for a respective mobile application (e.g., update history 108 of FIG. 1). The update history can include a release date and size of each respective update since a first release of the mobile application. Update history can be retrieved from, for example, a database, a third party website, a website related to the mobile application, a mobile application store (app-store), or a different source.

In operation 304, the update manager can perform machine learning on the update history collected in operation 302. Operation 304 can include performing various algorithms configured to learn from, and make predictions about, a set of data (e.g., the update history collected in operation 302). In various embodiments, the update manager can perform supervised, unsupervised, semi-supervised, and/or reinforcement machine learning in operation 304. In various embodiments, operation 304 can include using decision tree learning, associated rule learning, artificial neural networks, deep learning, inductive logic programming, support vector machines, clustering, Bayesian networks, representation learning, similarity and metric learning, sparse dictionary learning, genetic algorithms, rule-based machine learning, and/or a learning classifier system.

In some embodiments, machine learning can include generating a model based on the update history. The update manager can generate a model fitted to respective dates of (or times between) and respective sizes of (or changes in size between) respective previous updates. The model can be configured to forecast an update date and an update size for a next update of the mobile application (e.g., an update occurring after the current update and for which no information is publically available). In some embodiments, the update manager generates an autoregressive integrated moving average (ARIMA) model based on the update history. Such a model can be based on differences between consecutive values of the update history, and a regression error generated by the model can be a linear combination of errors from previous terms.

In some embodiments, the model is a different autoregressive model (e.g., an autoregressive moving average (ARMA) model). In some embodiments, the model is a different type of model such as a recurrent neural network (e.g., long-short term memory (LSTM)). Regardless of the type of machine learning mechanism used, the update manager can perform operation 304 in order to predict a date and/or size of a next update for the mobile application.

In operation 306, the update manager predicts a release date and size of at least a next update based on the machine learning performed in operation 304. For example, the update manager can forecast a release date and/or size of a next update by extrapolating the model generated in operation 304. In some embodiments, the update manager predicts a range of release dates and/or a range of sizes for the next update. In some embodiments, the update manager generates a confidence interval and/or a percent confidence for the predicted release date and predicted size of the next update. In some embodiments, the update manager predicts an earliest next update date, a latest next update date, a smallest next update size, and/or a largest next update size.

In operation 308, the update manager outputs the prediction. In various embodiments, the update manager can output one or more of a date, a range of dates, a size (e.g., 10 megabytes (MB)), a range of sizes, an amount of time (e.g., 46 days), a confidence interval, a percent confidence, and/or a net update frequency score. A net update frequency score can be a higher score for a longer predicted time to a next update and a lower score for a shorter predicted time to a next update. For example, a net update frequency score can be higher for a next predicted update to occur in three months than a next predicted update to occur in one week. In some embodiments, the update manager outputs a subscore that can be integrated into the score generated in operation 210 of FIG. 2. In some embodiments, the update manager outputs the information to a user interface.

Figure 4:
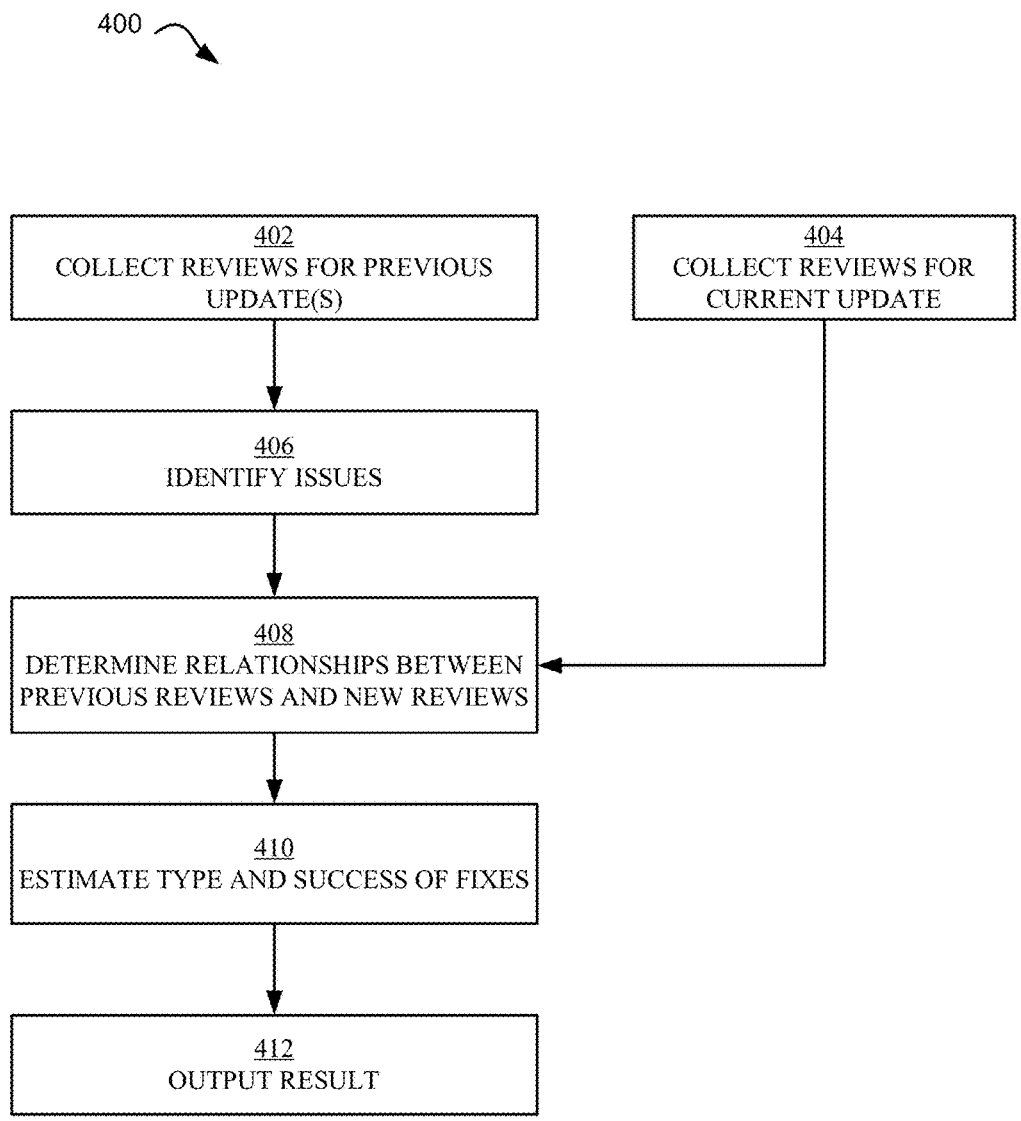
FIG. 4 illustrates a flowchart of an example method for determining changes caused by an update in accordance with some embodiments of the present disclosure.

Referring now to FIG. 4, illustrated is a flowchart of an example method for determining changes made by a current update in accordance with some embodiments of the present disclosure. In some embodiments, the method 400 is a sub-method of operation 206 of FIG. 2. The method 400 can be executed by an update manager (e.g., update manager 118 of FIG. 1) or by a processor executing instructions. For consistency, the method 400 will hereafter be described as being implemented by an update manager, however, the method 400 can likewise be executed by different configurations of hardware components executing instructions.

In operation 402, the update manager can collect reviews (e.g., reviews 106 of FIG. 1) from previous updates. In some embodiments, the update manager collects reviews generated between the previous update and the current update. In some embodiments, the update manager collects reviews generated before the current update. The update manager can collect the reviews from a repository, a database, a mobile application store (app-store), a social media platform, or a different source.

In operation 404, the update manager can collect reviews (e.g., reviews 106 of FIG. 1) based on the current update. The reviews can be collected from a repository, a database, a mobile application store (app-store), a social media platform, or a different source. The reviews can be reviews created since the current update was issued and during the first time period that the current update was deferred in operation 202 of FIG. 2. As shown in FIG. 4, operations 402 and 404 can occur approximately simultaneously or sequentially so long as both operation 402 and operation 404 occur before operation 408.

In operation 406, the update manager can identify issues based on the collected reviews. For example, the update manager can use text clustering to extract problems reported by various user reviews based on keywords appearing in those user reviews. In some embodiments, the update manager ranks the reported problems based on, for example, vox populi (e.g., the number of users reporting the problem). For example, the update manager can rank the reported problems in descending order with a highest ranked problem associated with the largest number of users reporting the problem. In some embodiments, the update manager can output problems identified and ranked in operation 406 as the most likely fixes in the current update (thus, in some embodiments, the method 400 comprises only operations 402 and 406). In some embodiments, the update manager continues to operation 408.

In operation 408, the update manager can calculate correlations between issues in previous reviews (collected in operation 402) and issues in current reviews (collected in operation 404). In some embodiments, the update manager determines a positive correlation if, for reviews related to similar issues, a rating (e.g., a star rating) is larger for the current review(s) than the previous review(s). In some embodiments, operation 408 can utilize sentiment analysis to determine if respective problems have improved or worsened (e.g., measuring a negative sentiment regarding an issue in the old reviews and a positive sentiment regarding the issue in the new reviews can indicate that the issue has been improved and/or resolved in the current update).

In some embodiments, sentiment can be based on ratings or based on changes in ratings. In a first example, a rating (or average rating) below three stars could indicate negative sentiment whereas a rating (or average rating) above three stars could indicate positive sentiment. In a second example, a rating (or average rating) associated with previous reviews could be two stars. A rating (or average rating) associated with newer reviews could be three stars. The positive change in rating (i.e., +1 star) between the previous reviews and the newer reviews could indicate positive sentiment.

In some embodiments, sentiment can be determined using, for example, natural language processing. For example, sentiment can be identified and/or scored based on feature words and sentiment words.

In operation 410, the update manager can estimate types of respective changes and success of respective changes based on the correlations measured in operation 408. For example, reviews for the previous update could be associated with a lower rating and comments on poor battery life. Reviews for the current update could be associated with a higher rating and comments on improved battery life. Operation 410 could indicate a high likelihood that battery life is improved with the current update.

In operation 412, the update manager can output the results. The update manager can output the result to a user interface and/or to operation 210 of FIG. 2. In some embodiments, the update manager outputs a respective estimated likelihood of resolution for each respective identified issue. In some embodiments, the update manager outputs a net improvement score based on the number of fixes and the estimated successes of the fixes. In such embodiments, a higher score can indicate significant improvement and a lower score can indicate minor improvement. In some embodiments, the update manager outputs a description of each fix and/or sample portions of reviews from users regarding those fixes to, for example, a user interface.

Figure 5:
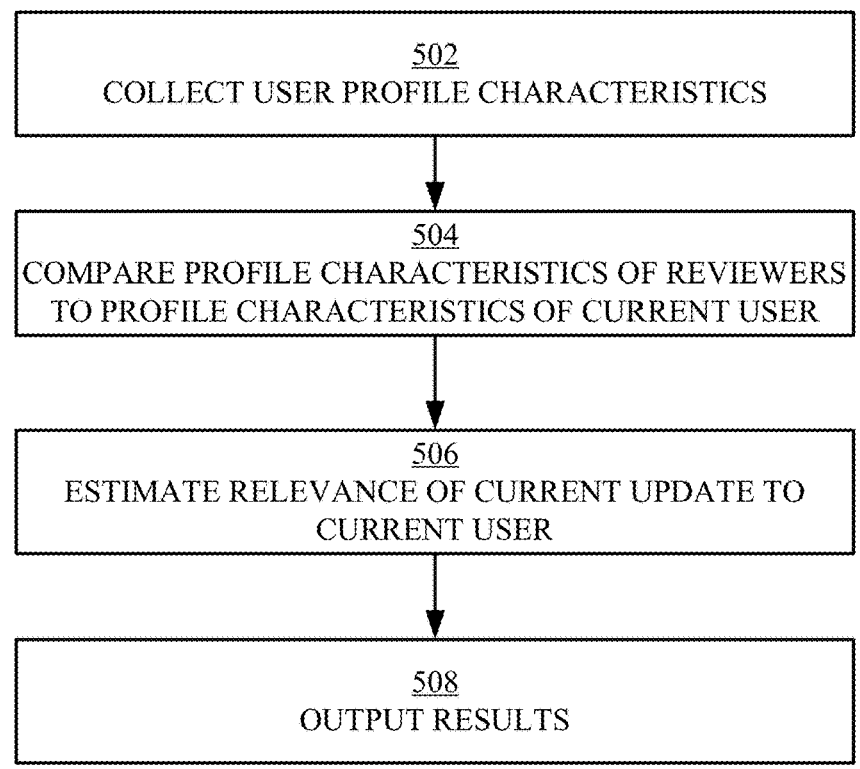
FIG. 5 illustrates a flowchart of an example method for determining a relevance of an update to a user in accordance with some embodiments of the present disclosure.

Referring now to FIG. 5, illustrated is a flowchart of an example method for determining relevancy of the current update to the user in accordance with some embodiments of the present disclosure. In some embodiments, the method 500 is a sub-method of operation 208 of FIG. 2. The method 500 can be executed by an update manager (e.g., update manager 118 of FIG. 1) or by a processor executing instructions. For consistency, the method 500 will hereafter be described as being implemented by an update manager, however, the method 500 can likewise be executed by different configurations of hardware components executing instructions.

In operation 502, the update manager collects user profile characteristics (e.g., user profile characteristics 110 of FIG. 1) for reviewers such as the reviewers generating reviews 106 of FIG. 1 and/or the reviewers posting reviews for the current update collected in operation 404 of FIG. 4. In some embodiments, the user profile characteristics can comprise, for example, amounts and types of usage of mobile applications by the user profile, a type (e.g., brand, model, and/or version) of a user device, a location (e.g., state, country), of the user device, and/or other characteristics.

In operation 504, the update manager compares profile characteristics of the reviewers to profile characteristics of the current user. In some embodiments, the update manager determines respective differences between the current user and each reviewer for respective characteristics. In some embodiments, the update manager determines a single relevancy score between the current user and each set of users associated with a review related to a particular issue.

In operation 506, the update manager estimates a relevance score of the current update to the current user based on the profile similarity between the current user and the reviewers, and further based on issues the reviewers indicated were improved and/or resolved as a result of the current update. For example, profile characteristics of the current user can indicate the current user uses a mobile application a significant amount. Profile characteristics of a set of reviewers can likewise indicate the reviewers use the mobile application a significant amount. This similarity could cause the update manager to determine the feedback from the set of reviewers is particularly applicable to the current user. If the feedback from the set of reviewers is positive, the update manager can determine the update is relevant to the current user.

In operation 508, the update manager can output the results to a user interface and/or to operation 210 of FIG. 2. The results can be a net relevance score, a percentage (e.g., a percent relevance of the current update to the user), a confidence (e.g., a percent confidence the update is relevant to the current user), and/or a textual indication of the relevance of the update to the user. In some embodiments, a higher net relevance score can indicate a higher relevance of a current update to a current user, whereas a lower net relevance score can indicate a lower relevance.

Figure 6:
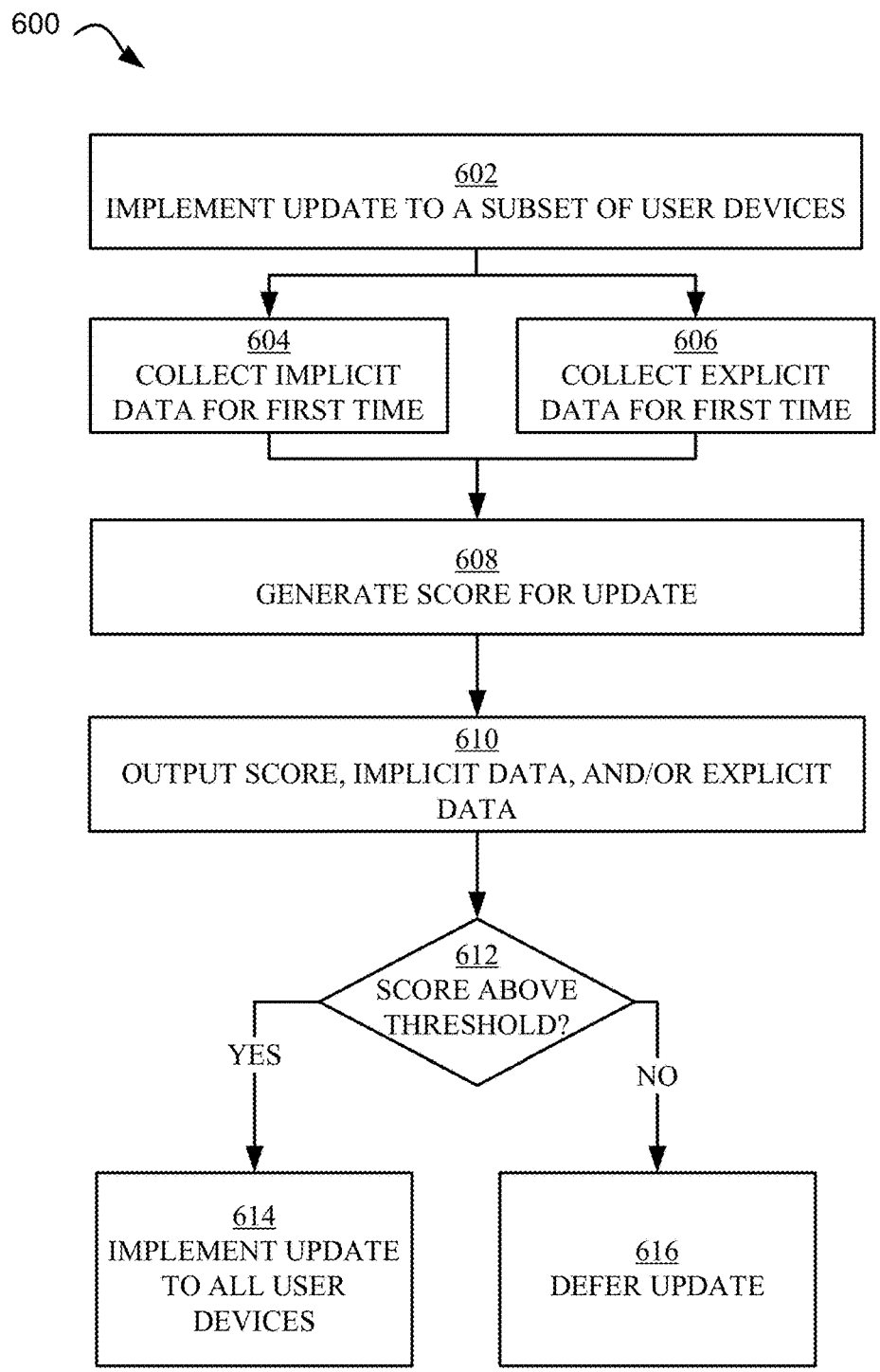
FIG. 6 illustrates a flowchart of an example method for enterprise management of an update in accordance with some embodiments of the present disclosure.

Referring now to FIG. 6, illustrated is a flowchart of an example method for implementing a mobile application update in an enterprise environment in accordance with some embodiments of the present disclosure. The method 600 can be executed by an enterprise update manager (e.g., enterprise update manager 116 of FIG. 1) or by a processor executing instructions. For consistency, the method 600 will hereafter be described as being implemented by an enterprise update manager, however, the method 600 can likewise be executed by different configurations of hardware components executing instructions.

In operation 602, the enterprise update manager can implement a current update to a subset of a set of user devices. For example, the enterprise update manager can implement a current update to 5%, 10%, or 20% of a total number of enterprise user devices configured to receive the current update. In some embodiments, the current update is implemented on less than 5%, less than 10%, or less than 20% of a total number of enterprise user devices configured to receive the current update.

In operation 604, the enterprise update manager collects implicit data associated with a first time period. Implicit data can be data such as, for example, battery life, performance of the device (e.g., as measured in speed, computational overhead, latency, or a different metric), mobile application usage, and so on.

In operation 606, the enterprise update manager can collect explicit data for the first time period. Explicit data can be data such as, for example, user feedback data mined from reviews generated since the current update. As shown in FIG. 6, operation 606 can occur approximately contemporaneously with operation 604, or operation 606 can occur after the first time period has expired.

The enterprise update manager can also be configured to perform any of the methods 300, 400, and/or 500 as discussed in FIGS. 3-5 as part of operations 604 and 606. For example, the enterprise update manager could perform the method 500 and determine an update is relevant to the enterprise based on normal, standard, and/or average usage habits of the enterprise user devices being similar to usage habits of users generating reviews indicating positive sentiment for the current update.

In operation 608, the enterprise update manager can generate a score for the update based on the implicit data and the explicit data. A higher score can indicate a better, safer, and/or otherwise desirable update whereas a lower score can indicate a worsened, insecure, or otherwise problematic update associated with limited improvements.

In operation 610, the enterprise update manager can output the score, implicit data, and/or explicit data to a user interface.

In operation 612, the enterprise update manager can determine if the score generated in operation 608 is above a threshold. If the score is above the threshold, then the enterprise update manager can proceed to operation 614 and execute the current update on all candidate devices in the enterprise (or output the recommendation to a user interface and, responsive to input to the user interface, implement the update). If the score is not above the threshold, the enterprise update manager can proceed to operation 616 and defer the update (or output the recommendation to a user interface, and, responsive to input to the user interface, defer the update). In some embodiments, operation 616 further comprises uninstalling the update to the subset of user devices selected in operation 602 and returning those devices to a previous version of the mobile application.

Figure 7:
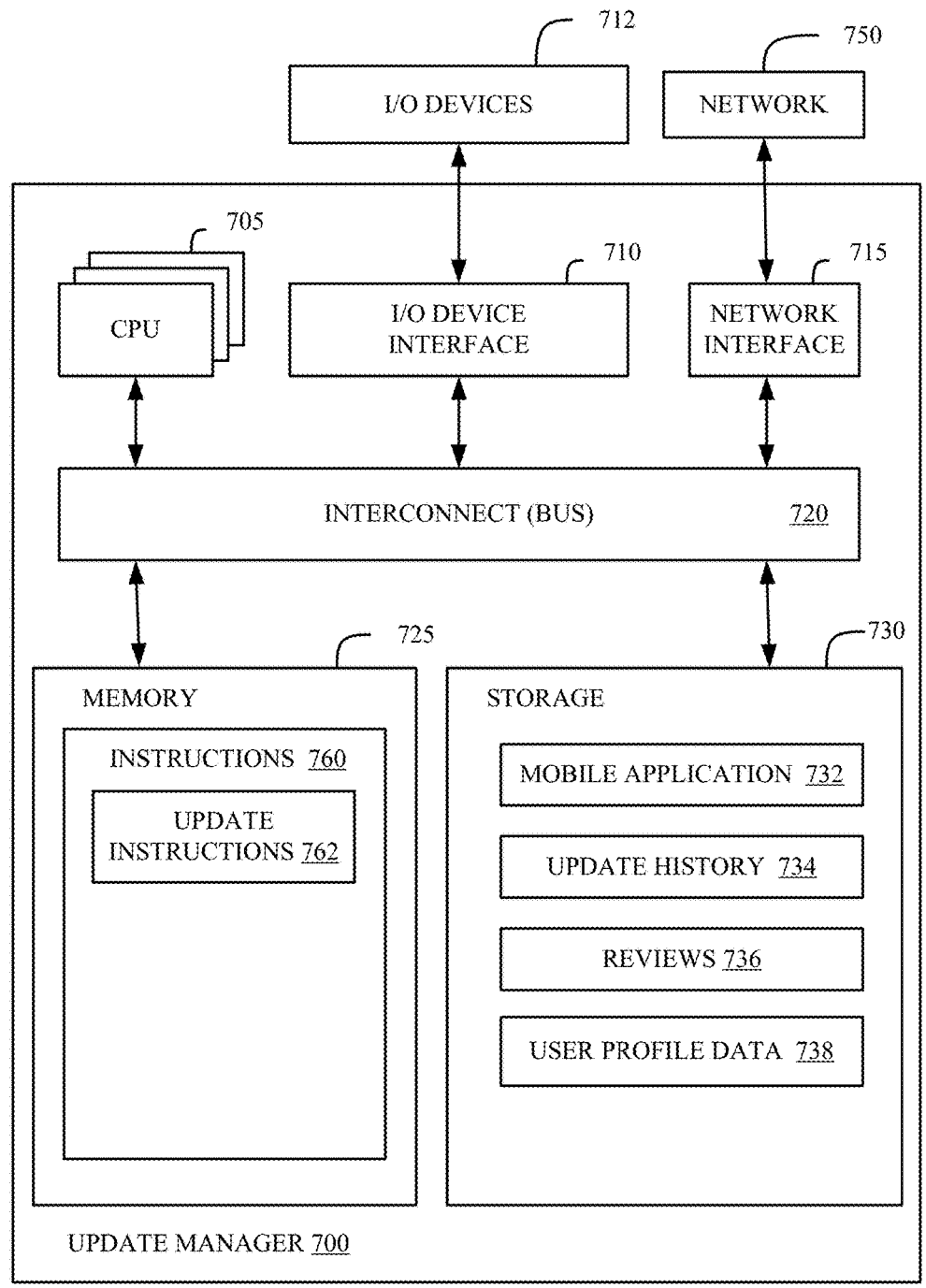
FIG. 7 illustrates a block diagram of an update manager in accordance with some embodiments of the present disclosure.

FIG. 7 illustrates a block diagram of an update manager 700 in accordance with some embodiments of the present disclosure. In some embodiments, update manager 700 is consistent with update manager 118 of FIG. 1 or enterprise update manager 116 of FIG. 1. In various embodiments, update manager 700 can perform, or provide executable instructions for the performance of, the methods described in FIGS. 2-6.

The update manager 700 can include a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, or flash memory devices. In an alternative embodiment, the storage 730 can be replaced by storage area-network (SAN) devices, the cloud, or other devices connected to the update manager 700 via the I/O devices interface 710 or a network 750 via the network interface 715.

In some embodiments, the memory 725 stores instructions 760 and the storage 730 stores mobile application 732, update history 734, reviews 736, and user profile data 738. However, in various embodiments, the instructions 760, mobile application 732, update history 734, reviews 736, and user profile data 738 are stored partially in memory 725 and partially in storage 730, or they are stored entirely in memory 725 or entirely in storage 730, or they are accessed over a network 750 via the network interface 715.

The mobile application 732 can comprise instructions for one or more mobile applications and include instructions for, or a notification of, a current update for the mobile application. In some embodiments, mobile application 732 is consistent with mobile application 104 of FIG. 1. Update history 734 can comprise dates and sizes of respective updates for the mobile application since a first version of the mobile application. In some embodiments, update history 734 is consistent with update history 108 of FIG. 1. Reviews 736 can comprise numeric and/or textural reviews of the mobile application by users. In some embodiments, reviews 736 are consistent with reviews 106 of FIG. 1. User profile data 738 can comprise profile characteristics for a user of a user device (e.g., user device 114 of FIG. 1) and for users associated with reviews 736. In some embodiments, user profile data 738 is consistent with user profile characteristics 110 of FIG. 1.

The instructions 760 are processor executable instructions including update instructions 762. Update instructions 762 can include instructions to execute the methods shown in FIGS. 2-6.

In various embodiments, the I/O devices 712 can include an interface capable of presenting information and receiving input. For example, 110 devices 712 can present information to a user interacting with update manager 700 and receive input from a user.

Update manager 700 is connected to the network 750 via the network interface 715. In some embodiments, network 750 is consistent with network 112 of FIG. 1.

Referring now to FIG. 8, illustrated is an example database of reviews in accordance with some embodiments of the present disclosure. Example database 800 can include, for respective reviews, a mobile application identifier (e.g., name, serial number, etc.) 802, a user identifier (e.g., a user name, a screen name, etc.) 804, a date of the review 806, a rating of the review (e.g., a star rating) 808, and review text 810. Although not shown, example database 800 can also include mobile application version information, user device information, and/or user profile characteristics. Although eight examples are shown, example database 800 can include many (e.g., thousands, millions) of reviews for many (e.g. hundreds, thousands) of mobile applications.

Positive reviews can be indicated by rating 808 and/or review text 810 (e.g., a five star rating and/or review text indicating improvements). Negative reviews can be likewise be indicated by rating 808 and review text 810 (e.g., a one or two star rating and/or review text indicating excessive updates, excessive advertisements, a lack of information about updates, and/or an unstable mobile application). In some embodiments, example database 800 can be stored in reviews 106 of FIG. 1 and/or reviews 736 of FIG. 7, used in operations 206 and/or 208 of FIG. 2, used in operations 402-408 of FIG. 4, used in operation 502 of FIG. 5, and/or used in operation 606 of FIG. 6.

Referring now to FIG. 9, illustrated is an example update history database in accordance with some embodiments of the present disclosure. Example update history database 900 can store, for respective updates, a date of the update 902 and a size of the update 904. In some embodiments, example update history database 900 can be stored in update history 108 of FIG. 1 and/or update history 734 of FIG. 7, used in operation 204 of FIG. 2, used in operation 302 of FIG. 3, and/or used in operation 604 of FIG. 6.

Figure 10:
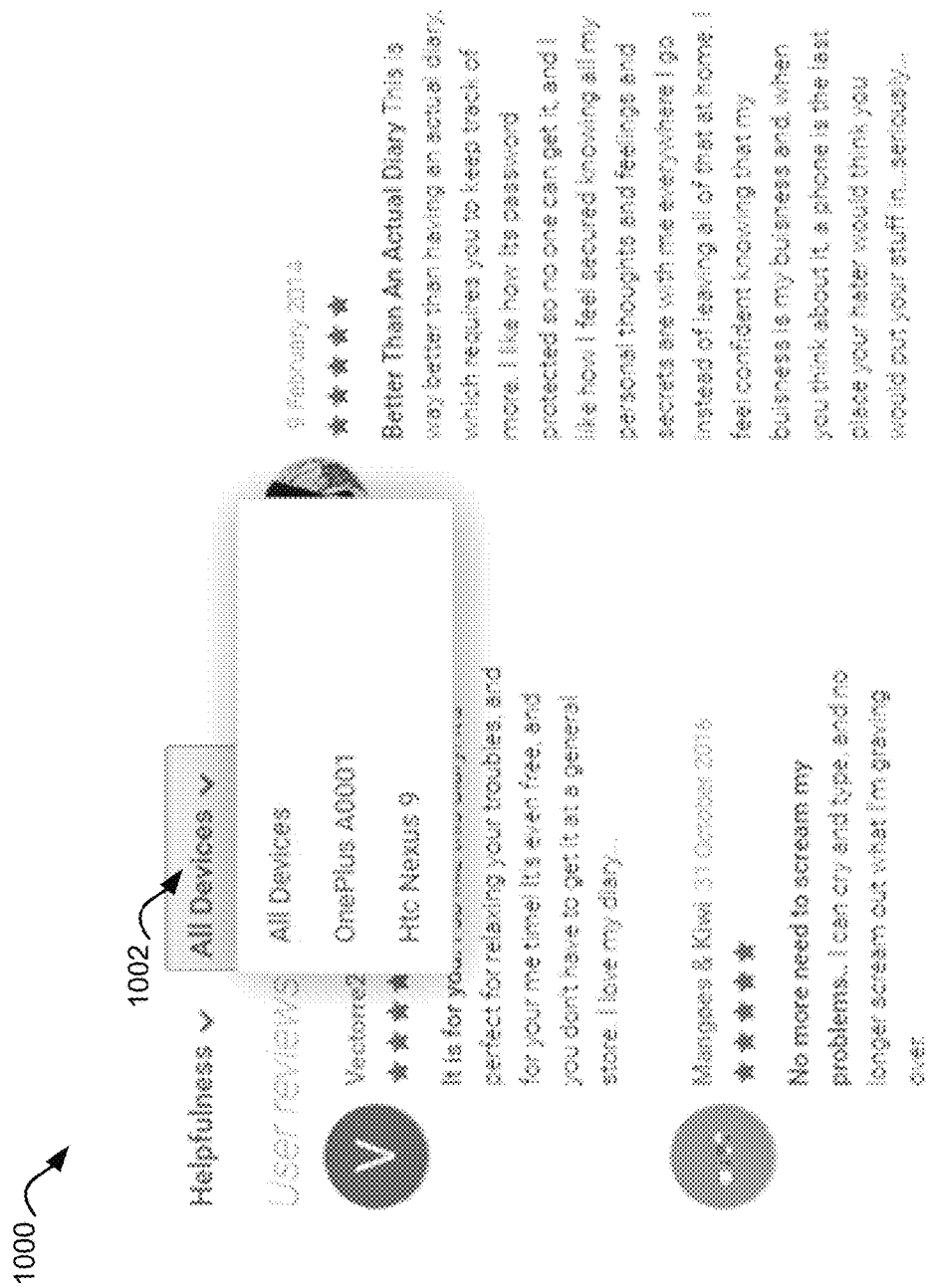
FIG. 10 illustrates a first example user interface in accordance with some embodiments of the present disclosure.

Referring now to FIG. 10, illustrated is an example user interface for organizing reviews in accordance with some embodiments of the present disclosure. Example user interface 1000 can be configured to present a subset of user reviews based on a type of user device associated with the user review using device dropdown 1002. Device dropdown 1002 can assist a user in locating relevant user reviews for a mobile application operating on a device similar to the user's device. In some embodiments, example user interface 1000 can be presented on a user device (e.g., user device 114 of FIG. 1). In some embodiments, example user interface 1000 can be output as part of operation 202 of FIG. 2.

Referring now to FIG. 11, illustrated is a second example user interface for organizing reviews in accordance with some embodiments of the present disclosure. Second example user interface 1100 can be configured to present, for respective user reviews of a mobile application, a version of the mobile application associated with the review. For example, the second example user interface 1100 can indicate that first example review 1102 and second example review 1104 are associated with an older version of the mobile application (e.g., older than a current version, or older than a version operating on the user device presenting the example user interface). Although not shown, the second example user interface 1100 can also include a drop-down menu for organizing reviews by a version associated with the review (e.g., similar to the drop-down menu shown in FIG. 10). In some embodiments, example user interface 1100 can be output as part of operation 202 of FIG. 2.

In some embodiments, the functionality of the example user interfaces illustrated in FIGS. 10-11 can be combined such that a single user interface can be configured to organize user reviews by a version of the mobile application associated with the user review and by a type of user device associated with the user review.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the methods described with respect to FIGS. 2-6) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
   deferring, for a first time period, a first update for a mobile application operating on a user device associated with a first user profile;
   determining a date of a next update for the mobile application and a size of the next update for the mobile application based on respective dates and respective sizes for previous updates for the mobile application, wherein the first time period is a proportion of time between a current date and the date of the next update;
   determining at least one change associated with the first update based on reviews of the mobile application by:
      identifying a plurality of issues based on keywords associated with negative reviews from a first set of reviews for a previous version of the mobile application;
      ranking the plurality of issues based on a number of negative reviews associated with each issue, wherein the plurality of issues are ranked in descending order such that a first issue is associated with a largest number of negative reviews; and
      identifying at least one change associated with the first update as the first issue associated with a highest rank of the plurality of issues;
   estimating a relevance of the at least one change to the first user profile based on characteristics of the first user profile and characteristics of at least a second user profile associated with at least one review of an updated version of the mobile application;
   generating a score based on the date of the next update, the size of the next update, the at least one change, and the relevance of the at least one change; and
   in response to the score being greater than a first threshold, implementing the first update for the mobile application on the user device.

2. The method of claim 1, further comprising:
   outputting, after the first time period, the date of the next update, the size of the next update, the at least one change associated with the first update, and the relevance of the at least one change to a user interface of the user device.

3. The method of claim 1, wherein determining a date of a next update for the mobile application and a size of a next update for the mobile application further comprises:
   generating a model of an update history of the mobile application, wherein the model comprises an autoregressive integrated moving average model.

4. The method of claim 1, wherein determining at least one change associated with the first update further comprises:
  collecting a first set of reviews for a previous version of the mobile application;
  collecting a second set of reviews for the updated version of the mobile application;
  identifying a first subset of reviews of the first set of reviews associated with a first issue using text clustering;
  identifying a second subset of reviews of the second set of reviews associated with the first issue using text clustering;
  determining a positive change in sentiment between the first subset of reviews and the second subset of reviews for the first issue; and
  determining at least one change comprising resolution of the first issue based on the positive change in sentiment.

5. The method of claim 4, wherein the first subset of reviews are associated with a first net rating, wherein the second subset of reviews are associated with a second net rating, and wherein a positive change in sentiment is based on the second net rating being larger than the first net rating.

6. The method of claim 5, wherein estimating a relevance of the set of changes to the first user profile further comprises:
  collecting a first set of profile characteristics from the first user;
  collecting at least a second set of profile characteristics from a second user associated with a review of the second subset of reviews;
  determining the first set of profile characteristics are similar to the second set of profile characteristics above a similarity threshold; and
  determining the update is relevant to the user.

7. A computer program product comprising a computer readable storage medium having program instructions embodied therewith, wherein the computer readable storage medium is not a transitory signal per se, the program instructions executable by a processor to cause the processor to perform a method comprising:
  deferring, for a first time period, a first update for a mobile application operating on a user device associated with a first user profile;
  determining a date of a next update for the mobile application and a size of the next update for the mobile application based on respective dates and respective sizes for previous updates for the mobile application, wherein the first time period is a proportion of time between a current date and the date of the next update;
  determining at least one change associated with the first update based on reviews of the mobile application by:
    identifying a plurality of issues based on keywords associated with negative reviews from a first set of reviews for a previous version of the mobile application;
    ranking the plurality of issues based on a number of negative reviews associated with each issue, wherein the plurality of issues are ranked in descending order such that a first issue is associated with a largest number of negative reviews; and
    identifying at least one change associated with the first update as the first issue associated with a highest rank of the plurality of issues;
  estimating a relevance of the at least one change to the first user profile based on characteristics of the first user profile and characteristics of at least a second user profile associated with at least one review of an updated version of the mobile application;
  generating a score based on the date of the next update, the size of the next update, the at least one change, and the relevance of the at least one change; and
  in response to the score being greater than a first threshold, implementing the first update for the mobile application on the user device.

8. The computer program product of claim 7, the program instructions further configured to cause the processor to perform a method further comprising:
  in response to the score being less than the first threshold, deferring the first update; and
  in response to receiving a second update for the mobile application, implementing the second update.

9. The computer program product of claim 7, wherein determining at least one change associated with the first update further comprises:
  collecting a first set of reviews for a previous version of the mobile application;
  collecting a second set of reviews for the updated version of the mobile application;
  identifying a first subset of reviews of the first set of reviews associated with a first issue using text clustering;
  identifying a second subset of reviews of the second set of reviews associated with the first issue using text clustering;
  determining a positive change in sentiment between the first subset of reviews and the second subset of reviews for the first issue; and
  determining at least one change comprising resolution of the first issue based on the positive change in sentiment.

10. The computer program product of claim 9, wherein the first subset of reviews are associated with a first net rating, wherein the second subset of reviews are associated with a second net rating, wherein a positive change in sentiment is based on the second net rating being larger than the first net rating.

11. The computer program product of claim 10, wherein estimating a relevance of the set of changes to the first user profile further comprises:
  collecting a first set of profile characteristics from the first user, wherein profile characteristics comprise an amount of usage of the mobile application, a model of the user device, and a location of the user device;
  collecting at least a second set of profile characteristics from a second user associated with a review of the second subset of reviews;
  determining the first set of profile characteristics are similar to the second set of profile characteristics above a similarity threshold; and
  determining the update is relevant to the user.

12. A system comprising:
  a processor communicatively coupled to a memory storing instructions which, when executed by the processor, cause the processor to perform a method comprising:
    deferring, for a first time period, a first update for a mobile application operating on a user device associated with a first user profile;
    determining a date of a next update for the mobile application and a size of the next update for the mobile application based on respective dates and respective sizes for previous updates for the mobile application, wherein the first time period is a proportion of time between a current date and the date of the next update;

determining at least one change associated with the first update based on reviews of the mobile application by:

identifying a plurality of issues based on keywords associated with negative reviews from a first set of reviews for a previous version of the mobile application;

ranking the plurality of issues based on a number of negative reviews associated with each issue, wherein the plurality of issues are ranked in descending order such that a first issue is associated with a largest number of negative reviews; and identifying at least one change associated with the first update as the first issue associated with a highest rank of the plurality of issues;

estimating a relevance of the at least one change to the first user profile based on characteristics of the first user profile and characteristics of at least a second user profile associated with at least one review of an updated version of the mobile application;

generating a score based on the date of the next update, the size of the next update, the at least one change, and the relevance of the at least one change; and in response to the score being greater than a first threshold, implementing the first update for the mobile application on the user device.

13. The system of claim 12, the processor configured to perform a method further comprising:

in response to the score being less than the first threshold, deferring the first update; and in response to receiving a second update for the mobile application, implementing the second update.

14. The system of claim 12, the processor configured to perform a method further comprising:

outputting, after the first time period, the date of the next update, the size of the next update, the at least one change associated with the first update, and the relevance of the at least one change to a user interface of the user device.

15. The system of claim 12, wherein determining a date of a next update for the mobile application and a size of a next update for the mobile application further comprises:

generating a model of an update history of the mobile application, wherein the model comprises an autoregressive integrated moving average model.

16. The system of claim 12, wherein determining at least one change associated with the first update further comprises:

collecting a first set of reviews for a previous version of the mobile application;

collecting a second set of reviews for the updated version of the mobile application;

identifying a first subset of reviews of the first set of reviews associated with a first issue using text clustering;

identifying a second subset of reviews of the second set of reviews associated with the first issue using text clustering;

determining a positive change in sentiment between the first subset of reviews and the second subset of reviews for the first issue; and determining at least one change as resolution of the first issue based on the positive change in sentiment.

17. The system of claim 16, wherein the first subset of reviews are associated with a first net rating, wherein the second subset of reviews are associated with a second net rating, wherein a positive change in sentiment is based on the second net rating being larger than the first net rating.

18. The system of claim 17, wherein estimating a relevance of the set of changes to the first user profile further comprises:

collecting a first set of profile characteristics from the first user;

collecting at least a second set of profile characteristics from a second user associated with a review of the second subset of reviews;

determining the first set of profile characteristics are similar to the second set of profile characteristics above a similarity threshold; and determining the update is relevant to the user.

* * * * *